United States Patent
Lee et al.

(10) Patent No.: US 12,027,127 B2
(45) Date of Patent: Jul. 2, 2024

(54) CONTROL METHOD FOR BACKLIGHT CIRCUIT, BACKLIGHT CIRCUIT AND LCD DISPLAY SCREEN

(71) Applicant: BEIJING XIANXIN TECHNOLOGY CO., LTD, Beijing (CN)

(72) Inventors: Kiwon Lee, Beijing (CN); Youngjin Lim, Beijing (CN); Chenghui Yan, Beijing (CN)

(73) Assignee: BEIJING XIANXIN TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/265,651

(22) PCT Filed: Oct. 19, 2021

(86) PCT No.: PCT/CN2021/124801
§ 371 (c)(1),
(2) Date: Jun. 6, 2023

(87) PCT Pub. No.: WO2022/127343
PCT Pub. Date: Jun. 23, 2022

(65) Prior Publication Data
US 2024/0096290 A1 Mar. 21, 2024

(30) Foreign Application Priority Data
Dec. 14, 2020 (CN) .......................... 202011462539.0

(51) Int. Cl.
G09G 3/34 (2006.01)
G09G 3/36 (2006.01)

(52) U.S. Cl.
CPC ............. *G09G 3/3406* (2013.01); *G09G 3/36* (2013.01); *G09G 2320/041* (2013.01); *G09G 2320/0626* (2013.01); *G09G 2330/021* (2013.01)

(58) Field of Classification Search
CPC ..................................................... G09G 3/3406
See application file for complete search history.

(56) References Cited

U.S. PATENT DOCUMENTS

2013/0002310 A1* 1/2013 Liu ....................... G09G 3/3677
327/109
2013/0314458 A1* 11/2013 Murai ................... G09G 3/3406
345/691
(Continued)

FOREIGN PATENT DOCUMENTS

CN 102314841 A 1/2012
CN 105390096 A 3/2016
(Continued)

*Primary Examiner* — William Boddie
*Assistant Examiner* — Andrew B Schnirel
(74) *Attorney, Agent, or Firm* — IPro, PLLC (57) ABSTRACT

A control method for a backlight circuit includes: obtaining a plurality of pieces of dimming data in a preset period of time; determining total accumulated electric energy received by the backlight source according to the plurality of pieces of dimming data in the preset period of time; and generating a first voltage control signal when the total accumulated electric energy reaches a preset electric energy threshold. The dimming data is used to control a backlight source to emit light. The preset period of time is from an initial moment of continuous light emission of the backlight source to a current moment. The first voltage control signal is used to reduce the working voltage of the backlight source. When the total accumulated electric energy reaches the preset electric energy threshold, reducing the working voltage of the backlight source does not affect a light emitting brightness of the backlight source.

11 Claims, 5 Drawing Sheets

(56) References Cited

U.S. PATENT DOCUMENTS

2014/0009510 A1   1/2014  Jin
2016/0267861 A1*  9/2016  Nakahara ............. G09G 3/3696
2019/0355322 A1*  11/2019  Liu ...................... G09G 3/3696

FOREIGN PATENT DOCUMENTS

| CN | 106409231 A | 2/2017 |
| CN | 107731160 A | 2/2018 |
| CN | 108766366 A | 11/2018 |
| CN | 111833823 A | 10/2020 |
| CN | 112233627 A | 1/2021 |

* cited by examiner

CONTROL METHOD FOR BACKLIGHT CIRCUIT, BACKLIGHT CIRCUIT AND LCD DISPLAY SCREEN

CROSS REFERENCE TO RELATED APPLICATIONS

The present application is a National Stage of International Application No. PCT/CN2021/124801, filed Oct. 19, 2021, which claims priority to the Chinese patent application No. 202011462539.0, filed with the China National Intellectual Property Administration (CNIPA) on Dec. 14, 2020 and entitled "CONTROL METHOD FOR BACKLIGHT CIRCUIT, BACKLIGHT CIRCUIT AND LCD DISPLAY SCREEN", the entire content of which is incorporated herein by reference.

TECHNICAL FIELD

The present application relates to the technical field of display devices, in particular to a control method for a backlight circuit, a backlight circuit and an LCD display screen.

BACKGROUND

With the development of technologies, a liquid crystal display screen (an LCD display screen for short) has become an important part of many electronic devices.

The LCD display screen is usually composed of a liquid crystal panel and a backlight circuit. The backlight circuit is located under the liquid crystal panel and is used to provide a backlight for the liquid crystal panel. In the prior art, a light emitting diode (an LED for short) is used as a backlight source. A sensor is used to detect a temperature of the LED. When it is determined that the temperature of the LED rises to a temperature threshold, an input voltage of the LED is reduced, so as to reduce consumption power of the LED, reduce a heating amount of the LED, and thus to prevent damage to the LED.

However, in the prior art, the sensor detecting the temperature of the LED has to be added in the LCD display screen, which changes a structure of the LCD display screen, makes the structure of the LCD display screen more complicated, and further makes a manufacturing process of the LCD display screen complicated and increases a manufacturing cost.

SUMMARY

The present application provides a control method for a backlight circuit, a backlight circuit and an LCD display screen, to provide a technical solution for reducing an LED voltage when an LED temperature reaches a preset threshold without modifying an LCD display structure.

In a first aspect, the present application provides a control method for a backlight circuit. The backlight circuit includes a backlight source, and the method includes:
 obtaining a plurality of pieces of dimming data in a preset period of time, where the dimming data is used to control the backlight source to emit light;
 determining total accumulated electric energy received by the backlight source according to the plurality of pieces of dimming data in the preset period of time; and
 generating a first voltage control signal if the total accumulated electric energy reaches a preset electric energy threshold, where the first voltage control signal is used to reduce a working voltage of the backlight source.

Optionally, the determining total accumulated electric energy received by the backlight source according to the plurality of pieces of dimming data in the preset period of time includes:
 determining electric energy corresponding to each piece of dimming data according to a preset mapping table; and
 summing the electric energy corresponding to each piece of dimming data to obtain the total accumulated electric energy.

Optionally, the backlight source includes at least one light source region, and the light source region includes at least one unit light source.

The summing the electric energy corresponding to each piece of dimming data to obtain the total accumulated electric energy includes:
 determining, for each light source region, regional accumulated electric energy received by the light source region according to the electric energy corresponding to the dimming data used to control the light source region; and
 obtaining the total accumulated power according to each regional accumulated electric energy and a weight of the light source region.

Optionally, the backlight source includes at least one light source region, and the light source region includes at least one unit light source.

The summing the electric energy corresponding to each piece of dimming data to obtain the total accumulated electric energy includes:
 determining, for each unit light source, single accumulated electric energy received by the unit light source according to the electric energy corresponding to the dimming data used to control the unit light source; and
 using the single accumulated electric energy meeting a preset condition as the total accumulated electric energy.

Optionally, the using the single accumulated electric energy meeting a preset condition as the total accumulated electric energy includes:
 using minimum single accumulated electric energy as the total accumulated electric energy.

Optionally, the method further includes:
 generating a drive signal according to experimental dimming data at a current moment, and generating an experimental control signal, where the drive signal is used to drive a single unit light source to emit light, and the experimental control signal is used to reduce a working voltage on the single unit light source;
 obtaining experimental accumulated electric energy received by the single unit light source according to a plurality of pieces of experimental dimming data from an initial moment to the current moment;
 using, if a light emitting brightness of the single unit light source meets a preset light emitting condition, the experimental accumulated electric energy as the preset electric energy threshold; and
 continuing, if the light emitting brightness of the single unit light source cannot meet the preset light emitting condition, to generate experimental dimming data of a next moment, and updating moment information.

Optionally, the experimental dimming data of each moment is the same.

In a second aspect, the present application provides a backlight circuit, including: a backlight source, a drive circuit and a dimming controller.

The dimming controller is used to execute the control method for the backlight circuit involved in the first aspect and optional solutions.

In a third aspect, the present application provides an LCD display screen, including: a liquid crystal panel and the backlight circuit involved in the second aspect.

In a fourth aspect, the present application provides a computer program product, including an instruction, and the instruction, when executed by a processor, implements the control method involved in the first aspect and optional solutions.

The present application provides the control method for the backlight circuit, the backlight circuit and the LCD display screen. The total accumulated electric energy received by the backlight source is determined according to the dimming data and can reflect a temperature change of the backlight source. When the total accumulated electric energy received by the backlight source reaches the preset electric energy threshold, the working voltage of the backlight source is reduced, and the backlight source can continuously provide backlight satisfying a preset brightness during voltage decrease working. Power consumption of the backlight source can be reduced without changing the structure of the backlight circuit, the manufacturing process of the backlight circuit does not need to be changed, and the manufacturing cost of the backlight circuit is not increased. In addition, regional accumulated electric energy of each light source region is calculated, the total accumulated electric energy is calculated and obtained according to the regional accumulated electric energy and a weight of each light source region. A contribution of each light source region to a temperature change of a backlight source can be considered, timing of the voltage decrease working of the backlight source is more accurately predicted, and a life of the backlight source is prolonged.

DETAILED DESCRIPTION

In order to make an objective, a technical solution and advantages of the present application clearer, the technical solution in the present application will be clearly and completely described below in combination with accompanying drawings in the present application. Apparently, described embodiments are part of embodiments of the present application, not all of them. Based on the embodiments in the present application, all other embodiments obtained by those ordinarily skilled in the art without making creative work belong to the protection scope of the present application.

Figure 1:
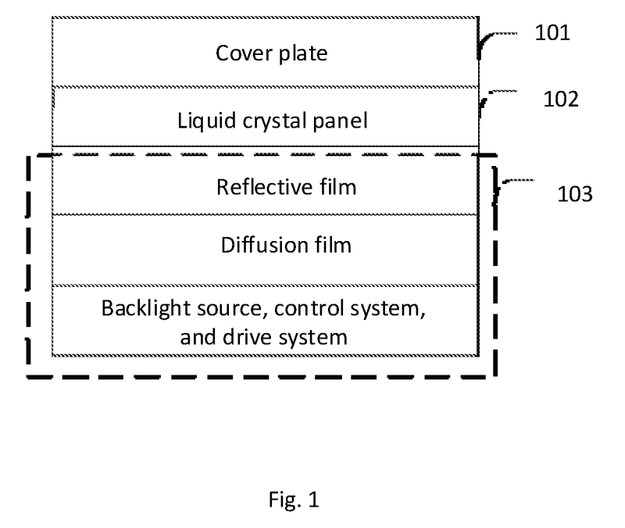
FIG. 1 is a schematic structural diagram of an LCD display screen provided by an embodiment of the present application.

An LCD display screen is an important part of many electronic devices, such as a TV provided with an LCD display screen and a monitor provided with an LCD display screen. As shown in FIG. 1, embodiments of the present application provide a structure of an LCD display screen. The LCD display screen includes a cover plate 101, a liquid crystal panel 102, a backlight structure 103, and a circuit board (not shown in the figure). The cover plate 101 is located on the liquid crystal panel 102 and is used to protect the liquid crystal panel 102. The backlight structure 103 is located under the liquid crystal panel 102 and is used to provide a backlight for the liquid crystal panel 102. The circuit board is connected to the liquid crystal panel and is used to drive the liquid crystal panel, so that the liquid crystal panel displays different contents.

The backlight structure in the LCD display screen is described emphatically below. The backlight structure usually includes a reflective film, a diffusion film, a backlight circuit, etc. The backlight circuit is used to provide backlight. The reflective film and the diffusion film are used to make light provided by the backlight source more evenly distributed. The backlight circuit includes the backlight source, a control system and a drive system. The drive system provides a drive signal for the backlight source, and the control system is used to control the drive system to generate the drive signal.

Figure 2:
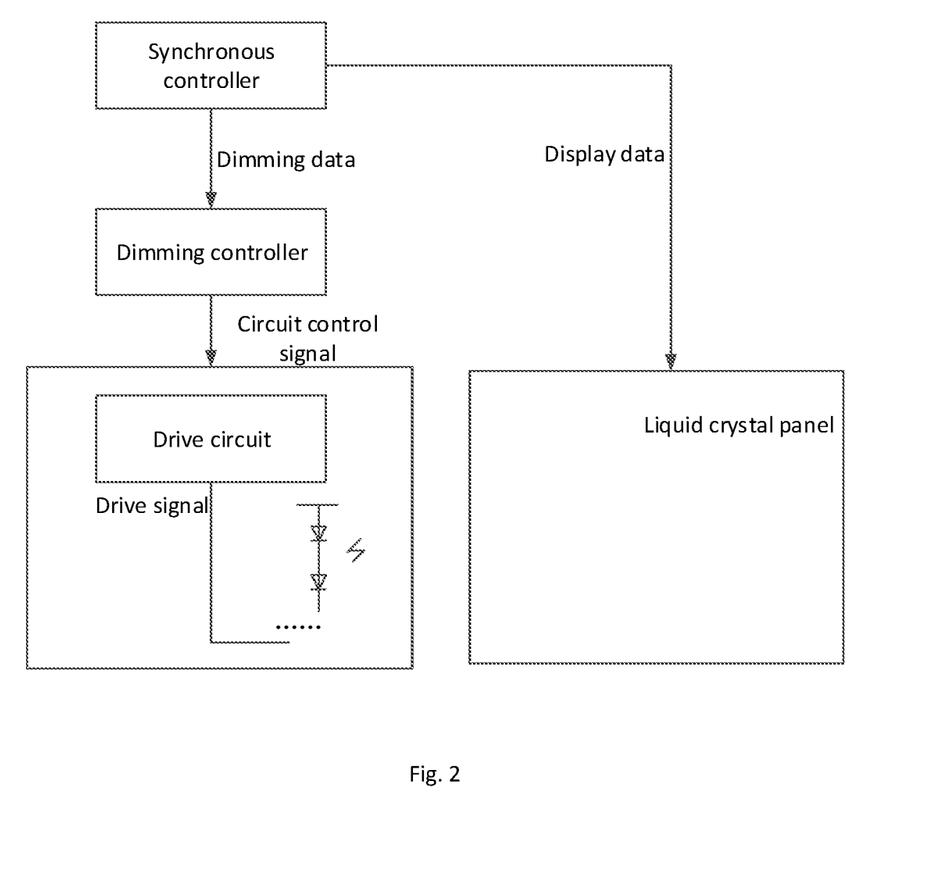
FIG. 2 is a schematic structural diagram of a backlight circuit provided by another embodiment of the present application.

The following is a detailed description of a structure of the backlight circuit. As shown in FIG. 2, the backlight circuit is composed of the backlight source, a dimming controller and a drive circuit. A principle of the backlight circuit to provide the backlight is as follows. Original data is input to the LCD display screen, and two channels of data are output through a synchronous controller, one channel is dimming data, and the other channel is display data. The dimming controller generates a circuit control signal used to control the drive circuit according to the dimming data output from the synchronous controller, so as to control the drive circuit to generate the drive signal. The driver circuit provides the drive signal to the backlight source. The drive signal may control a light emitting brightness of the backlight source, and thus different brightnesses are displayed on the LCD display screen.

If a use time of the backlight source is increased, or, the brightness of the backlight source is increased in order to output a brighter picture on the LCD display screen, a temperature of the backlight source will rise.

Figure 3:
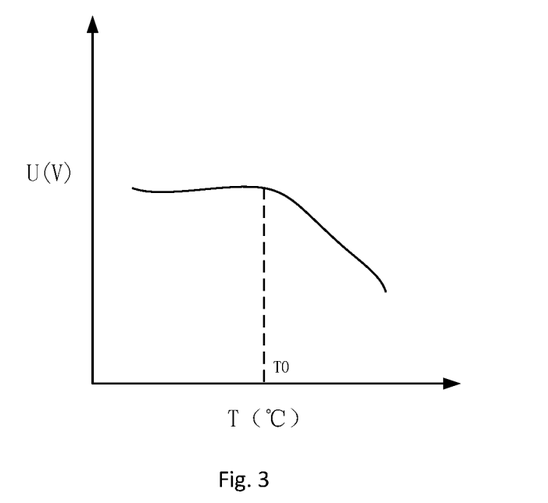
FIG. 3 is a temperature-voltage characteristic curve of a light emitting diode when providing light of the same brightness provided by the present application.

The LED is usually used as the backlight source. As shown in FIG. 3, according to a characteristic curve of the LED, when a temperature of the LED exceeds a temperature threshold TO, an input voltage required for emitting light of the same brightness decreases significantly as the temperature of the LED rises, that is, the temperature of the LED is inversely proportional to consumed electric energy while the input voltage of the LED is unchanged.

In the prior art, a sensor is used to detect a temperature of an LED, such as a temperature sensor or a light sensor. When it is determined that the temperature of the LED rises to a temperature threshold, an input voltage of the LED is reduced to reduce LED consumption power, further reduce a heating amount of the LED, and thus prevent damage to the LED.

However, in the prior art, the sensor detecting the temperature of the LED has to be added in the LCD display screen and a structure of the LCD display screen has to be changed, making the structure of the LCD display screen more complicated, which in turn makes a manufacturing process of the LCD display screen complicated and increases a manufacturing cost.

The present application provides a control method for a backlight circuit, a backlight circuit and an LCD display screen, to provide a technical solution for reducing an LED voltage when an LED temperature reaches a preset threshold without modifying an LCD display structure. An inventive concept of the present application is as follows. The dimming data is used to control the backlight source in the backlight circuit to emit light. The electric energy received by the backlight source can be obtained according to the dimming data. Part of the electric energy received by the backlight source will be converted to thermal energy, that is, the electric energy received by the backlight source can reflect the temperature change of the backlight source, and then the working voltage of the backlight source can be controlled according to the received electric energy. In the solution, the temperature change of the backlight source is obtained through the dimming data, without adding the sensor for detecting the backlight source in the LCD display screen, without modifying the structure of the backlight circuit, without changing the manufacturing process of the backlight circuit, and without increasing the manufacturing cost.

Figure 4:
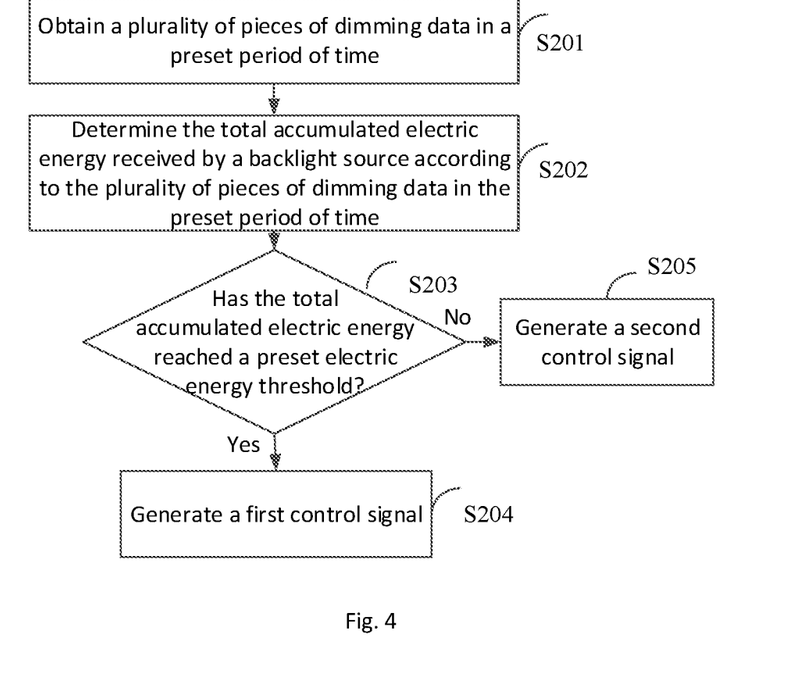
FIG. 4 is a schematic flow diagram of a control method for a backlight circuit provided by another embodiment of the present application.

As shown in FIG. 4, embodiments of the present application provide a control method for a backlight circuit. An executive subject of the control method is a dimming controller, and the control method includes the following steps.

S201, a plurality of pieces of dimming data in a preset period of time are obtained.

Video data is input to an LCD display screen, and then two channels of data are output through a synchronous controller, one channel is the dimming data, and the other channel is display data. The dimming controller receives the dimming data and controls a driver circuit to drive a backlight source to emit backlight with a corresponding brightness. A panel controller of the liquid crystal panel receives the display data and controls the liquid crystal panel to display content indicated by the above display data. The backlight emitted from the backlight source and the display data displayed on the liquid crystal panel are superimposed to present content indicated by the video data on the LCD display screen.

The preset period of time refers to a period of time during which the backlight source continuously emits light, specifically from an initial moment of continuous light emitting to a current moment. A temperature change of the backlight source is a continuous accumulated process, and the dimming data in the preset period of time can reflect a temperature of the backlight source at the current moment.

S202, total accumulated electric energy received by the backlight source is determined according to the plurality of pieces of dimming data in the preset period of time.

The dimming controller generates a circuit control signal according to the dimming data. The circuit control signal controls the drive circuit to generate a drive signal. The drive signal can control a light emitting brightness of the backlight source, so a relationship between the dimming data and the electrical energy received by the backlight source can be determined through a calibration mode.

A mapping table indicating a corresponding relationship between the dimming data and the electric energy received by the backlight source is loaded when the controller is started. Electric energy corresponding to each piece of dimming data is determined according to the preset mapping table. The electric energies corresponding to the respective pieces of dimming data are summed to obtain the total accumulated electric energy.

S203, whether the total accumulated electric energy reaches a preset electric energy threshold is judged, if yes, S204 is performed, and otherwise, S205 is performed.

The backlight source is a light emitting diode. If the total accumulated electric energy reaches the preset electric energy threshold, it means that the temperature of the backlight source is high and has reached the temperature threshold TO. When the temperature of the light emitting diode reaches the temperature threshold, a working voltage required to emit the backlight with the same brightness will be reduced, and thus making the backlight source perform voltage decrease working will not affect the backlight brightness provided by the backlight source. If the total accumulated electric energy is less than the preset electric energy threshold, the working voltage of the backlight source is maintained.

S204, a first voltage control signal is generated.

When the temperature of the backlight source is determined to be high by the total accumulated electric energy, the first voltage control signal for reducing the working voltage of the backlight source is generated to reduce power loss of the backlight source, which in turn can reduce a heating amount of the backlight source and thus prevent damage to the backlight source.

S205, a second voltage control signal is generated.

When the temperature of the backlight source is determined to be low by the total accumulated electric energy, the second voltage control signal for maintaining the working voltage of the backlight source is generated.

In the control method provided by the embodiments of the present application, the total accumulated electric energy received by the backlight source is determined according to the dimming data used to control the backlight source to emit light. The total accumulated electric energy can reflect the temperature change of the backlight source. The working voltage of the backlight source is reduced when the total accumulated electric energy meets a preset electric energy threshold, i.e., when the temperature of the backlight source is high. In the solution, the power loss of the backlight source can be reduced on the basis of not changing the structure of the backlight circuit, the heating amount of the backlight source is reduced, and the life of the backlight source is prolonged.

Figure 5:
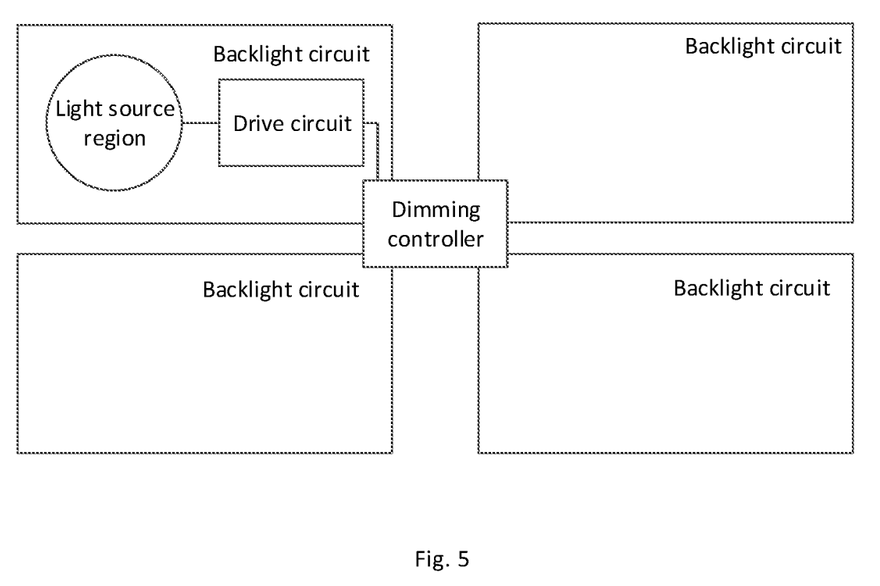
FIG. 5 is a schematic structural diagram of a backlight circuit provided by another embodiment of the present application.

Embodiments of the present application provide a control method for a backlight circuit, as shown in FIG. 5, a backlight source includes at least one light source region, and the light source region includes at least one unit light source. An executive subject of the control method is a dimming controller, and the control method includes the following steps.

S301, a plurality of pieces of dimming data in a preset period of time are obtained.

As for each light source region, the dimming data for controlling the light source region from an initial moment of continuous light emission to a current moment is obtained. Supposing the backlight source includes 4 light source regions, marked as a light source region 1 to a light source region 4 respectively. For the light source region 1, the dimming data from the initial moment of continuous light emission of the light source region 1 to the current moment is obtained. For the light source region 2 to the light source region 4, same operations can be performed and will not be repeated here.

S302, total accumulated electric energy received by the backlight source is determined according to the plurality of pieces of dimming data in the preset period of time.

Electric energy corresponding to each piece of dimming data is first determined according to a preset mapping table, and then regional accumulated electric energy received by the light source region is determined according to the electric energy corresponding to the dimming data used to control the light source region. That is, the electric energy corresponding to the dimming data of all unit light sources in a single light source region is superimposed to obtain the regional accumulated electric energy received by each light source region.

The total accumulated power is obtained according to each regional accumulated electric energy and a weight of the light source region after the regional accumulated electric energy received by each light source region is obtained. That is, the total accumulated electric energy is obtained by multiplying each regional accumulated electric energy and the weight corresponding the light source region and then superimposing them.

A weight value of the light source region may be determined according to a probability of a failure of the light source region. If the probability of the failure of the light source region is high, the weight value of the light source region may be set large. If the probability of the failure of the light source region is low, the weight value of the light source region may be set low.

Continue to take the backlight source including 4 light source regions as an example, the light source region 1 contains 16 unit light sources. In a period from the initial moment of continuous light emission to the current time of the unit light sources, 10 groups of dimming data are received. Each group of dimming data includes 16 groups of sub-dimming data, and the 16 groups of sub-dimming data and the 16 unit light sources are in one-to-one correspondence.

For each group of dimming data, the electric energy corresponding to the 16 groups of sub-dimming data is calculated, and then 16 pieces of data representing electric energy may be obtained. For the light source region 1 from the initial moment to the current moment, 160 data representing electric energy may be obtained, and the 160 data representing the electric energy are superimposed to obtain the regional accumulated electric energy of the light source region 1. For the light source region 2 to the light source region 4, same operations can be performed and will not be repeated here.

S303, whether the total accumulated electric energy reaches a preset electric energy threshold is judged, if yes, S304 is performed, and otherwise, S305 is performed.

S304, a first voltage control signal is generated.

When the total accumulated electric energy reaches the preset electric energy threshold, the first voltage control signal for reducing a working voltage of the backlight source is generated. When the working voltage of the backlight source is reduced, the power loss of the backlight source is reduced, and a heating amount of the backlight light source is reduced accordingly, which can prolong the life of the backlight source.

S305, a second voltage control signal is generated.

When the temperature of the backlight source is determined to be low by the total accumulated electric energy, the second voltage control signal for maintaining the working voltage of the backlight source is generated.

In the control method for the backlight circuit provided by the embodiments of the present application, the regional electric energy of each light source region is calculated, and then the total accumulated electric energy of the backlight source is calculated according to the weight of each light source region and the regional electric energy, taking into account the heat contribution of each light source region to the backlight source, so that the total accumulated electric energy can accurately reflect the temperature rise of the backlight source, which can timely reduce the working voltage of the backlight source and prolong the life of the backlight source.

Embodiments of the present application provide a control method for a backlight circuit, continue to refer to FIG. 5, a backlight source includes at least one light source region, and the light source region includes at least one unit light source. An executive subject of the control method is a dimming controller, and the control method includes the following steps.

S401, a plurality of pieces of dimming data in a preset period of time are obtained.

As for each unit light source, the dimming data from an initial moment of continuous light emission to a current moment of the unit light source is obtained.

S402, total accumulated electric energy received by the backlight source is determined according to the plurality of pieces of dimming data in the preset period of time.

Electric energy corresponding to each piece of dimming data is first determined according to a preset mapping table, and single accumulated electric energy received by the unit light source is determined according to the electric energy corresponding to the dimming data used to control the unit light source. That is, the electric energy corresponding to the dimming data controlling the unit light source from the initial moment to the current moment is summed to obtain the single accumulated electric energy.

After the single accumulated electric energy of the unit light source is obtained, the single accumulated electric energy meeting a preset condition is used as the total accumulated electric energy. Preferably, minimum single accumulated electric energy is used as the total accumulated electric energy.

Continue to take the backlight source including 4 light source regions as an example, the light source region 1 contains 16 unit light sources. In a period from the initial moment of continuous light emission to the current time of the unit light sources, 10 groups of dimming data are received. Each group of dimming data includes 16 groups of sub-dimming data, and the 16 groups of sub-dimming data and the 16 unit light sources are in one-to-one correspondence.

For each unit light source, 10 data representing electric energy may be obtained from the initial moment to the current moment, and the 10 data representing the electric energy are superimposed to obtain the single accumulated electric energy of the unit light source.

S403, whether the total accumulated electric energy reaches a preset electric energy threshold is judged, if yes, S404 is performed, and otherwise, S405 is performed.

If the minimum single accumulated electric energy is selected as the total accumulated electric energy, which means that temperatures of all unit light sources in the backlight source reach the temperature threshold TO, the working voltages of all the unit light sources are reduced.

S404, a first voltage control signal is generated.

S405, a second voltage control signal is generated.

In the control method provided by the embodiments of the present application, the single accumulated electric energies of all the unit power sources is calculated. If the minimum single accumulated electric energy reaches a preset electric energy threshold, that is, when the temperatures of all the unit light sources in the backlight source is high, the working voltages of all the unit light sources are reduced to ensure that all the unit light sources can still provide bright enough backlight during voltage decrease working, without affecting a working state of the backlight source.

Embodiments of the present application provide a control method for a backlight circuit. An executive subject of the control method is a dimming controller, and the control method includes the following steps.

S501, a drive signal is generated according to experimental dimming data at a current moment, and an experimental control signal is generated.

The experimental dimming data is randomly generated within a range of dimming data received by the dimming controller. The dimming controller processes the experimental dimming data to generate a circuit control signal for controlling a drive circuit. The drive circuit generates a drive signal under the control of the circuit control signal. The drive signal is used to drive a single unit light source to emit light.

To simplify a calculation process, the experimental dimming data may be set the same for each moment. For example, a pulse modulation signal with the same pulse width is adopted.

The experimental control signal is used to reduce a voltage applied to the single unit light source, that is, to make the unit light source works at a reduced voltage.

S502, experimental accumulated electric energy received by a single unit light source is obtained according to a plurality of pieces of experimental dimming data from an initial moment to the current moment.

The electric energies corresponding to the experimental dimming data controlling the unit light source from the initial moment to the current moment are obtained, and the electric energies corresponding to the experimental dimming data are superimposed to obtain the experimental accumulated electric energy.

S503, whether a light emitting brightness of the single unit light source meets a preset light emitting condition is judged, if yes, S504 is performed, and otherwise, S505 is performed.

The preset light emitting condition refers to whether the light emitting brightness of the single unit light source reaches a minimum backlight brightness required to be provided by the backlight source.

The light emitting brightness of the single unit light source reaching the minimum backlight brightness required to be provided by the backlight source means that the light emitting brightness of the single unit light source meets the preset light emitting condition.

The light emitting brightness of the single unit light source being less than the minimum backlight brightness required to be provided by the backlight source means that the light emitting brightness of the single unit light source cannot meet the preset light emitting condition.

S504, the experimental accumulated electric energy is used as the preset electric energy threshold.

If the light emitting brightness of the single unit light source meets the preset light emitting condition, then reducing the working voltage of the unit light source will not affect the working state of the unit light source. That is, at this time the temperature of the backlight source has reached the temperature threshold TO, then the experimental accumulated electric energy may be used as the preset electric energy threshold.

S505, experimental dimming data of a next moment continues to be generated, moment information is updated, and S501 is performed.

If the preset light emitting condition is not met, it means that the temperature of the backlight source has not reached the temperature threshold TO, and it is necessary to continue to generate the experimental dimming data for the next moment and use the next moment as the current moment.

S506, a plurality of pieces of dimming data in a preset period of time are obtained.

S507, total accumulated electric energy received by the backlight source is determined according to the plurality of pieces of dimming data in the preset period of time.

S508, whether the total accumulated electric energy reaches a preset electric energy threshold is judged, if yes, S509 is performed, and otherwise, S510 is performed.

S509, a first voltage control signal is generated.

S510, a second voltage control signal is generated.

S506 to S510 have been described in detail in the above embodiments and will not be repeated here.

It should further be noted that S501 to S505 are not limited to before S506, but can also be between S506 and S508, and are not limited here.

In the control method provided by the embodiments of the present application, through a step-by-step experimental method, the total accumulated electric energy from the initial moment to the subsequent moment is calculated. The brightness of the backlight source during the corresponding moment of the voltage reduction operation is judged. If the brightness of the backlight source meets the preset brightness condition, the total accumulated electric energy at that moment is used as the preset electric energy threshold, which can ensure that the backlight circuit can continue to provide the brightness that meets the preset brightness condition even when the total accumulated electric energy reaches the preset threshold during the voltage reduction operation.

Figure 6:
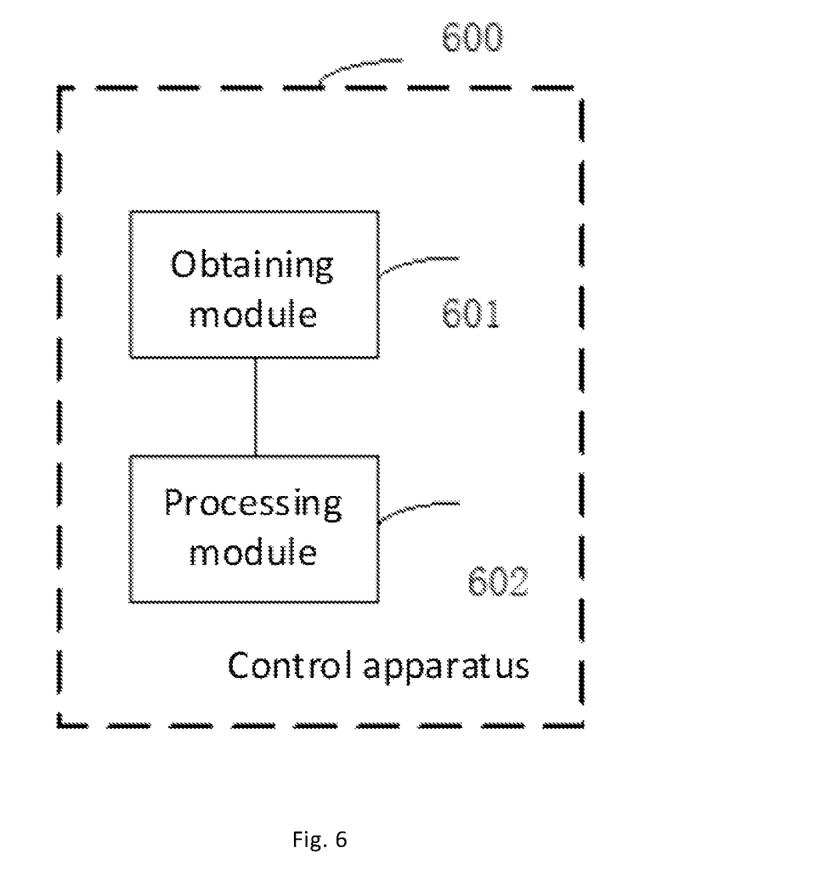
FIG. 6 is a schematic structural diagram of a control apparatus for a backlight circuit provided by another embodiment of the present application.

As shown in FIG. 6, the present application provides a control apparatus 600 for a backlight circuit, and the apparatus 600 includes:

an obtaining module 601, configured to obtain a plurality of pieces of dimming data in a preset period of time, where the dimming data is used to control a backlight source to emit light; and a processing module 602, configured to determine total accumulated electric energy received by the backlight source according to the plurality of pieces of dimming data in the preset period of time, and configured to generate a first voltage control signal if the total accumulated electric energy reaches a preset electric energy threshold, where the first voltage control signal is used to reduce a working voltage of the backlight source.

Optionally, the processing module 602 is configured to:

determine electric energy corresponding to each piece of dimming data according to a preset mapping table; and sum the electric energy corresponding to each piece of dimming data to obtain the total accumulated electric energy.

Optionally, the backlight source includes at least one light source region, and the light source region includes at least one unit light source. The processing module 602 is configured to:

determine, for each light source region, regional accumulated electric energy received by the light source region according to the dimming data used to control the light source region; and obtain the total accumulated power according to each regional accumulated electric energy and a weight of the light source region.

Optionally, the backlight source includes at least one light source region, and the light source region includes at least one unit light source. The processing module 602 is configured to:

determine, for each unit light source, single accumulated electric energy received by the unit light source according to the dimming data used to control the unit light source; and use the single accumulated electric energy meeting a preset condition as the total accumulated electric energy.

Optionally, the processing module 602 is configured to:

use minimum single accumulated electric energy as the total accumulated electric energy.

Optionally, the processing module 602 is further configured to:

generate a drive signal according to experimental dimming data at a current moment, and generate an experimental control signal, where the drive signal is used to drive a single unit light source to emit light, and the experimental control signal is used to reduce a working voltage on the single unit light source;

obtain experimental accumulated electric energy received by the single unit light source according to a plurality of pieces of experimental dimming data from an initial moment to the current moment;

use, if a light emitting brightness of the single unit light source meets a preset light emitting condition, the experimental accumulated electric energy as the preset electric energy threshold; and continue, if the light emitting brightness of the single unit light source cannot meet the preset light emitting condition, to generate experimental dimming data of a next moment, and update moment information.

Optionally, the experimental dimming data of each moment is the same.

Embodiments of the present application further provide a computer program product, including an instruction, and the instruction, when executed by a processor, implements the control method described in the above embodiments.

Finally, it should be noted that the above embodiments are only used to illustrate the technical solution of the present application, not to limit it; although the present application has been described in detail with reference to the above embodiments, those ordinarily skilled in the art should understand that they can still modify the technical solution recorded in the above embodiments or make equivalent replacement for some or all of the technical features; and these modifications or replacements do not separate the essence of the corresponding technical solution from the scope of the technical solution of the embodiments of the present application.

What is claimed is:

1. A control method for a backlight circuit, wherein the backlight circuit comprises a backlight source, and the method comprises:

obtaining a plurality of pieces of dimming data in a preset period of time, wherein the dimming data is used to control the backlight source to emit light; wherein the preset period of time is from an initial moment of continuous light emission of the backlight source to a current moment;

determining total accumulated electric energy received by the backlight source according to the plurality of pieces of dimming data in the preset period of time; wherein the total accumulated electric energy reflects a working temperature of the backlight source at the current moment; and generating a first voltage control signal when the total accumulated electric energy reaches a preset electric energy threshold, wherein the first voltage control signal is used to reduce a working voltage of the backlight source;

wherein when the total accumulated electric energy reaches the preset electric energy threshold, reducing the working voltage of the backlight source does not affect a light emitting brightness of the backlight source.

2. The control method according to claim 1, wherein said determining total accumulated electric energy received by the backlight source according to the plurality of pieces of dimming data in the preset period of time comprises:

determining electric energy corresponding to each piece of dimming data according to a preset mapping table; and summing the electric energy corresponding to each piece of dimming data to obtain the total accumulated electric energy; wherein, the preset mapping table is a corresponding relationship between the dimming data and the electric energy.

3. The control method according to claim 2, wherein the backlight source comprises at least one light source region, and the light source region comprises at least one unit light source; and said summing the electric energy corresponding to each piece of dimming data to obtain the total accumulated electric energy comprises:

determining, for each light source region, regional accumulated electric energy received by the each light source region according to the electric energy corresponding to the dimming data used to control the each light source region; and obtaining the total accumulated electric energy according to each regional accumulated electric energy and a weight of the each light source region.

4. The control method according to claim 2, wherein the backlight source comprises at least one light source region, and the light source region comprises at least one unit light source; and said summing the electric energy corresponding to each piece of dimming data to obtain the total accumulated electric energy comprises:

determining, for each unit light source, single accumulated electric energy received by the each unit light source according to the electric energy corresponding to the dimming data used to control the unit light source; and using the single accumulated electric energy meeting a preset condition as the total accumulated electric energy.

5. The control method according to claim 4, wherein said using the single accumulated electric energy meeting a preset condition as the total accumulated electric energy comprises:
  using minimum single accumulated electric energy as the total accumulated electric energy.

6. The control method according to claim 1, further comprising:
  generating a drive signal according to experimental dimming data at an experimental current moment, and generating an experimental control signal, wherein the drive signal is used to drive a single unit light source to emit light, and the experimental control signal is used to reduce a working voltage on the single unit light source;
  obtaining experimental accumulated electric energy received by the single unit light source according to a plurality of pieces of experimental dimming data from an experimental initial moment to the experimental current moment;
  using, when a light emitting brightness of the single unit light source meets a preset light emitting condition, the experimental accumulated electric energy as the preset electric energy threshold; and
  continuing, when the light emitting brightness of the single unit light source does not meet the preset light emitting condition, to generate experimental dimming data of a next experimental moment, and updating the experimental current moment as the next experimental moment.

7. The control method according to claim 6, wherein the experimental dimming data of each experimental moment is same.

8. A backlight circuit, comprising: a backlight source, a drive circuit and a dimming controller; wherein
  the dimming controller is used to execute the control method for the backlight circuit according to claim 1.

9. An LCD screen, comprising: a liquid crystal panel and the backlight circuit according to claim 8.

10. A non-transitory computer program product, comprising an instruction, wherein the instruction, when executed by a processor, implements the control method according to claim 1.

11. The control method according to claim 1, further comprising:
  generating a second voltage control signal when the total accumulated electric energy does not reach the preset electric energy threshold, wherein the second voltage control signal is used to maintain the working voltage of the backlight source.

* * * * *